US007353201B2

(12) United States Patent
Bjelogrlic et al.

(10) Patent No.: US 7,353,201 B2
(45) Date of Patent: Apr. 1, 2008

(54) SECURITY CONSTRAINED UNIT COMMITMENT PRICING OPTIMIZATION USING LINEAR PROGRAMMING FOR ELECTRICITY MARKETS

(75) Inventors: Milan Bjelogrlic, San Dimas, CA (US); Petar Ristanovic, Maple Grove, MN (US)

(73) Assignee: Siemens Power Transmission & Distribution, Inc., Wendell, NC (US)

( * ) Notice: Subject to any disclaimer, the term of this patent is extended or adjusted under 35 U.S.C. 154(b) by 904 days.

(21) Appl. No.: 10/409,328

(22) Filed: Apr. 8, 2003

(65) Prior Publication Data

US 2004/0181478 A1 Sep. 16, 2004

Related U.S. Application Data

(63) Continuation-in-part of application No. 10/385,011, filed on Mar. 10, 2003.

(51) Int. Cl.
G06Q 40/00 (2006.01)
G06F 17/00 (2006.01)
(52) U.S. Cl. .................................. 705/37; 705/400
(58) Field of Classification Search ................ 705/412, 705/37, 400, 1, 7, 8, 10, 26, 27, 286, 291
See application file for complete search history.

(56) References Cited

U.S. PATENT DOCUMENTS 3,903,402 A * 9/1975 Petit et al. ..................... 700/6
6,021,402 A * 2/2000 Takriti ........................ 705/412
7,099,839 B2 * 8/2006 Madoff et al. ................ 705/37
2002/0152305 A1 * 10/2002 Jackson et al. ............. 709/224
2002/0165816 A1 * 11/2002 Barz ........................... 705/37
2002/0194113 A1 * 12/2002 Lof et al. ...................... 705/37
2003/0041002 A1 * 2/2003 Hao et al. ..................... 705/37
2003/0055776 A1 * 3/2003 Samuelson ................... 705/37
2003/0149603 A1 * 8/2003 Ferguson et al. ............... 705/7
2004/0054551 A1 * 3/2004 Ausubel et al. ................ 705/1
2004/0054564 A1 * 3/2004 Fonseca et al. ................ 705/7
2004/0215348 A1 * 10/2004 Ilic et al. ....................... 700/1

FOREIGN PATENT DOCUMENTS

WO  WO 02/103465 A2 * 12/2002

OTHER PUBLICATIONS

The Investment FAQ (part 19 or 20); 1997-2003.*

* cited by examiner

Primary Examiner—Igor N Borissov

(57) ABSTRACT

The present invention is a method for optimizing security constrained unit commitment in the day ahead wholesale electricity market using mixed integer linear programming techniques. The wholesale electricity market uniquely requires the submission of offers to supply energy and ancillary services at stated prices, as well as bids to purchase energy, and known operating and security constraints. The present invention address the above noted needs by providing a SCUC engine to support and implement the requirements via a computer system implementation.

19 Claims, 1 Drawing Sheet

SECURITY CONSTRAINED UNIT COMMITMENT PRICING OPTIMIZATION USING LINEAR PROGRAMMING FOR ELECTRICITY MARKETS

CROSS-REFERENCE TO RELATED APPLICATIONS

This application is a continuation-in-part of U.S. patent application Ser. No. 10/385,011 filed on Mar. 10, 2003, which is herein incorporated by reference.

TECHNICAL FIELD

This invention relates generally to the optimization management of wholesale electricity markets. In particular, the invention pertains to the optimization of security constrained unit commitment in regional wholesale day ahead energy markets.

BACKGROUND ART

This invention relates generally to a method of determining the optimal commitments of energy and ancillary services for wholesale energy market clearing and pricing. In particular, the invention pertains to the optimal selection of offers submitted by market participants to satisfy energy and ancillary service requirements for regional electricity markets while satisfying operating and security constraints. It may be used by electricity market operators such as Regional Transmission Organizations, Independent System Operators, and Independent Transmission Providers. It may also be used by market participants as a tool to study various possible bidding strategies and to simulate possible market results.

A brief description of how electricity markets function under the Federal Energy Regulatory Commission ("FERC") regulations may be helpful in understanding the field of the present invention. In April 1996, FERC Order 888, "Promoting Wholesale Competition Through Open Access Nondiscriminatory Transmission Services by Public Utilities," required jurisdictional public utilities to file open access transmission tariffs to allow competition in the supply of wholesale electrical energy. Under the Order 888 market entities (utilities, merchant generators, energy traders, etc) compete to provide energy based on several factors including cost and availability of transfer capacity on transmission facilities. Market entities can be limited from providing energy to certain regions based on the availability of transfer capacity on transmission facilities. This order had the effect of introducing competition by allowing access to the transmission system to allow transportation of electricity from buyer to seller.

A next stage in the development of electricity markets was the FERC Order 2000, "Regional Transmission Organizations," issued in December 1999. This order required jurisdictional public utilities to form and participate in a Regional Transmission Organization ("RTO"). The operational control of generators, and transmission facilities was assigned to the Regional Transmission Organization. Under FERC regulations, RTOs are required, among other things; to ensure that its transmission customers have access to an ancillary services and real time balancing market. An RTO may cover parts of one or more states within the United States. RTOs are required to maintain efficient traffic grid management, to improve grid reliability, to monitor and mitigate against opportunities for discriminatory transmission practices, and to improve competition in the wholesale electricity markets. The RTO is expected to administer the open access transmission tariff, to exercise operational control over congestion management, reliability and to plan the expansion of its transmission system. An additional set of requirements for RTOs are that they remain independent of the market participants.

FERC also authorized the startup of several regional electricity markets, including the PJM, ISO NE, NYISO, and the CAISO. These markets had different rules including those that govern a wholesale spot market for electrical energy. The operators of these markets are faced with the need to select offers provided by market participants that satisfy requirements and operating constraints.

The next stage in the development of electricity markets is the July 2002, FERC Notice of Proposed Rulemaking (NOPR), "Remedying Undue Discrimination through Open Access Transmission Service and Standard Electricity Market Design." This NOPR announces FERC's intent to form a standard market design for wholesale electrical energy that would apply to all jurisdictional utilities This NOPR requires public utilities to place their transmission assets that are used in interstate commerce under the control of an Independent Transmission Provider or ITP. Among other functions, an ITP is responsible for operating a day ahead market and a real time market for electrical energy and ancillary services.

In the day ahead market for electricity, spot market prices are generally determined based on offers to supply energy and on forecast requirements for load. One possible solution is to determine a supply curve using either marginal costs or bid prices to rank order the plants beginning with the cheapest plants. Bids are selected starting with the cheapest and ascending until requirements are satisfied. However, it is necessary to consider operational constraints, which leads to selection of bids out of merit order. Heuristic methods are used to determine which bid to select out-of-order. There are, however, better possible approaches that are based on optimization. Additionally, the FERC NOPR recognizes that to create a truly competitive wholesale power market, the market must also allow for price responsive loads.

In this framework, the market operator receives pricing information from various wholesale market generators (typically coal-fired power plants, hydroelectric power plants, nuclear power plants, etc.) and receives energy requirements information from the Load Serving Entities The market operator is then responsible for determining an operating plan based on the offers provided by the various market generators and the bids provided by the various Load Serving Entities in the most cost effective manner.

Optimization tools are necessary to determine market clearing and commodity pricing based on submitted offers, while meeting operating and security constraints. This invention addresses the needs of a market operator by allowing the modeling of the technical characteristics of the offers as well as the transmission operating and security constraints. Offers include the supply of ancillary services by means of generating units and as well as price sensitive loads. The invention allows the selection of the optimal choice among the offered products based on selected criteria such as minimizing the payments made by the market operator to the market suppliers. The present invention address the above noted needs by facilitating an efficient day ahead clearance and pricing mechanism for complex co-optimized solutions for trading of energy and ancillary services.

SUMMARY OF THE INVENTION

According to one aspect of the invention, there is provided a system for optimizing the selection of offers submitted to the market operator by market participants such that all requirements for energy and ancillary services are satisfied along with operating and security constraints. The problem is formulated as a mixed integer linear program. Offers are formulated as piecewise linear functions. Operating constraints are formulated as linear inequalities. Commitment or selection decisions are formulated as integer variables. The results of this problem are the market clearing prices for each offered commodity and the amounts of products to be awarded to each market participant.

BRIEF DESCRIPTION OF THE FIGURES

The present invention will now be described with reference to the accompanying drawings wherein.

DETAILED DESCRIPTION OF THE FIGURES

Figure 1:
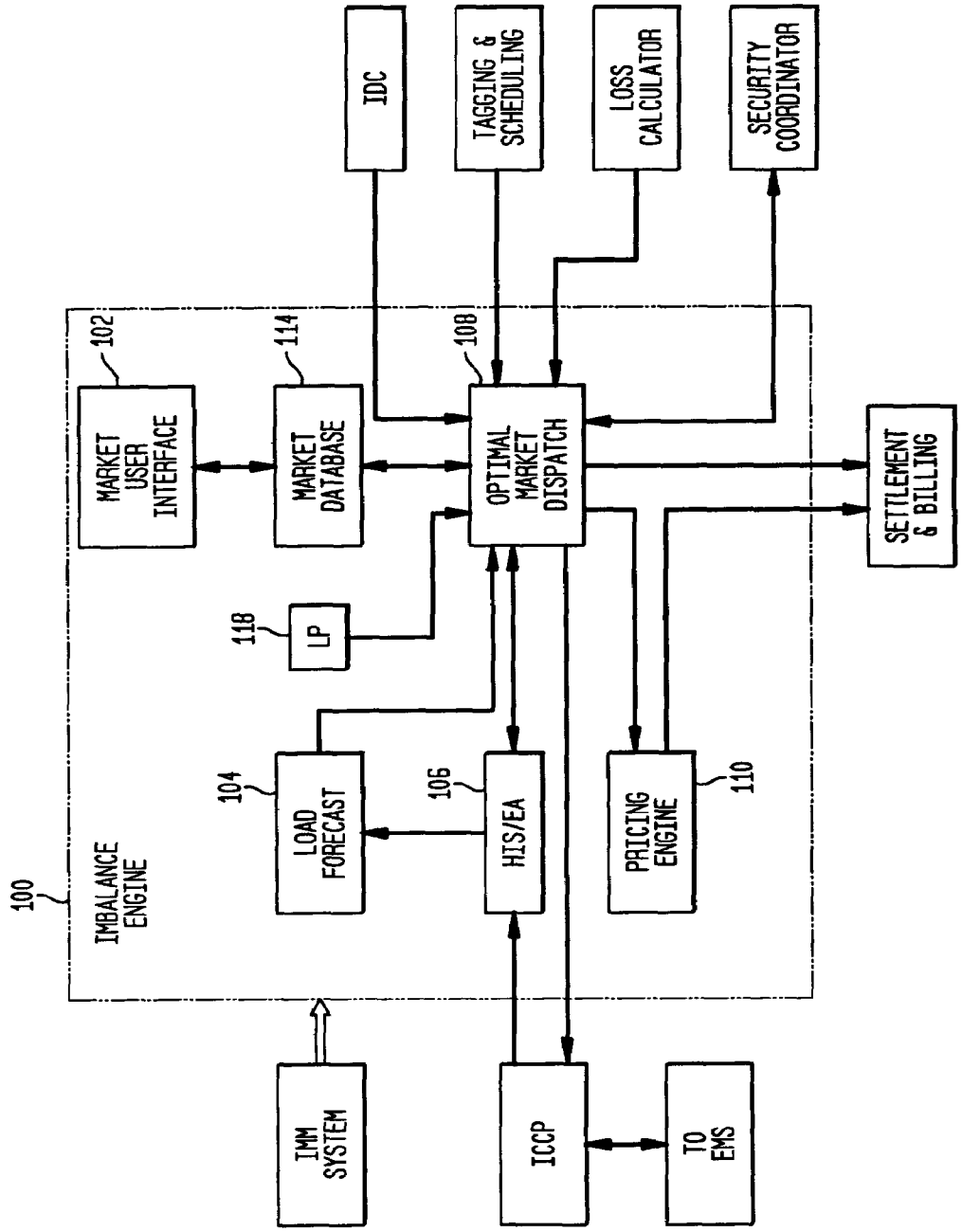
FIG. 1 is a schematic diagram of the system in accordance with the principles of the present invention.

To illustrate the principles of the present invention, a Security Constrained Unit Commitment (SCUC) co-optimization engine as developed by Siemens Power Transmission & Distribution, Inc., the assignee of the present invention, shall be described in detail. While this SCUC co-optimization engine constitutes a preferred embodiment of the invention, it is not the intention of applicants to limit the scope of the invention to the particular details of this engine. Rather, it is the intention of the applicants that the invention be defined by the appended claims and all equivalents thereto.

Referring to FIG. 1, there is shown an exemplary block diagram of the components and interfaces of an SCUC co-optimization engine 100 in accordance with the principles of the present invention. The SCUC co-optimization engine 100 consists generally of a Market User Interface 102, a Load Forecast engine 104, a component for handling and archiving market data (HIS) 106, SCUC 108, a component for market commodity pricing (Pricing Engine) 110, and a Market Database 114. A Mixed Integer Linear Programming engine is also included as an optimization tool (MILP), 118.

The objective of the day ahead security constrained unit commitment problem is defined as a minimization of the sum of the total market costs. This can be mathematically formulated as:

$$\sum_{t=1}^{T}\left\{\sum_{i=1}^{N}\left[c_{start}(i,t)\cdot Z(i,t)+c_{nold}(i,t)\cdot Y(i,t)+\right.\right.$$

$$\left.\left.c_{en}(i,t)+c_{reg}(i,t)+\sum_{j\in com'}c_j(i,t)\right]\right\}\to Min$$

where:

$c_{start}(i,t)$ is the start up cost of the generating bid i at time step t;

$Z(i,t)$ is the start up binary variable of the generating bid i in time step t;

$c_{nold}(i,t)$ is the no load cost segment of the generating bid i in time step t;

$Y(i,t)$ is the status binary variable of the generating bid i in time step t;

$c_{en}(i,t)$ is the cost of the commodity energy of the bid i in time step t;

$c_{reg}(i,t)$ is the cost of the commodity regulating reserve energy of bid I in time step t;

The above formulation assumes that in a most general case the day ahead SCUC is a large co-optimization problem. The co-optimization problem simultaneously clears energy, regulation and other ancillary services, mainly reserves. In the above formulation, the assumption is that three types of reserves can be supported. The three types of reserves are (1) the ten minute spinning reserve, (2) the ten minute non-spinning reserve, and (3) the thirty minutes operating reserve.

The total sum of the supply energy bids must be equal to the sum of load bids of price sensitive loads and load bids of price non-sensitive (fixed) loads for each time step of the study period. The mathematical formulation is:

$$\sum_{i=1}^{N}\frac{p_{en}(i,t)}{pf_{en}}-\sum_{j=1}^{N_{psld}}\frac{p_{psld}(j,t)}{pf_{ld}(j,t)}=\sum_{k=1}^{N_{fxld}}p_{fxld}(k,t),\forall t$$

where:

$p_{en}(i,t)$ is the power of commodity energy of the bid I at time step t;

$pf_{en}$ is the power penalty factor pf the generating bid I at time step t;

$p_{psld}(i,t)$ is the power of price sensitive load of the load bid i at time step t;

$pf_{ld}(i,t)$ is the power penalty factor of the price dependent load bid i at time step t;

$p_{fxld}(i,t)$ is the power of price non-sensitive load of the load bid i at time step t;

The following ancillary services are considered in the present model. The regulating reserve, ten minute spinning reserve, and thirty minute operating reserve. The ancillary service constraints are (1) regulating reserve; (2) ten minute spinning reserve, (3) ten minute non-spinning reserve, and (4) thirty minute operating reserve.

These ancillary services are considered in turn. The regulating reserve must be greater than or equal to the system regulating reserve requirements, expressed mathematically as:

$$\sum_{i=1}^{N}p_{reg}(i,t)\geq P_{reg}^{req}(t),\forall t$$

where:

$p_{reg}(i,t)$ is the power of commodity regulating reserve energy of the bid i at time t;

$p_{reg}^{req}(t)$ is the system regulating reserve requirements at time step t.

and each regulating reserve bid must satisfy the following relations:

$$0\leq p_{reg}(i,t)\leq\min\{RR(i,t),\mathrm{ramp}^{10}(i),\max[0,0.5\cdot(RH(i,t)-SS(i,t))]\}\cdot W(i,t),\forall i,t$$

where:

$RR(i,t)$ is the regulating reserve range of the generating bid i at time step t;

RH(i,t) is the regulating high capacity limit of the generating bid i at time step t;

SS(i,t) is the self committed and scheduled capacity of the generating bid i at time step t;

W(i,t) is the regulating status binary variable of the generating bid i at time step t;

and $\text{ramp}^{10}(i)$ is the ten minute ramp capability of the generating bid i.

For the ten minute spinning reserve, at each time step of the study period, the total ten minute spinning reserve must be greater than or equal to the ten minute spinning reserve requirements, governed by the following mathematical formulation:

$$\sum_{i=1}^{N} p_{tmsr}(i, t) \geq P_{tmsr}^{req}(t), \forall\, t$$

where:

$p_{tmsr}(i,t)$ is the power of commodity ten minute spinning reserve of bid i at time step t;

and $p_{tmsr}^{req}(t)$ is the system ten minute spinning reserve requirement at time t.

Each ten minute spinning reserve bid must satisfy the following mathematical formulation:

$0 \leq p_{tmsr}(i,t) \leq \min[\text{ramp}^{10}(i,t), p_{max}(i,t) - SS(i,t)] \cdot Y(i,t),$ As for the ten minute non-spinning reserve, at each time step of the study period, the ten minute non-spinning reserve must be greater than or equal to the system ten minute non spinning reserve requirements by the following mathematical formulation:

$$\sum_{i=1}^{N} p_{tmns}(i, t) \geq P_{tmns}^{req}(t) \,\forall\, t$$

where:

$p_{tmns}(i,t)$ is the power of commodity ten minute non-spinning reserve of bid i at time step t;

and $p_{tmns}^{req}(t)$ is the system ten minute non-spinning reserve requirement at time t.

Each ten minute non-spinning reserve bid must satisfy the following relation in mathematical formulation:

$0 \leq p_{tmns}(i,t) \leq \min[\text{ramp}^{10}(i,t), p_{max}(i,t) - SS(i,t)] \cdot [1 - Y(i,t)] \forall i,t$ As for the thirty minute operating reserve, at each time period of the study period, the total thirty minute operating reserve must be greater than or equal to the system thirty minute operating reserve requirements, as governed by the following mathematical formulation:

$$\sum_{i=1}^{N} p_{tmor}(i, t) \geq P_{tmor}^{req}(t) \,\forall\, t$$

where:

$p_{tmor}(i,t)$ is the power of commodity ten minute operating reserve of bid i at time step t;

and $p_{tmor}^{req}(t)$ is the system ten minute operating reserve requirement at time t.

Each thirty minute operating reserve bid must satisfy the following relation:

$0 \leq p_{tmor}(i,t) \leq \min[\text{ramp}^{30}(i), p_{max}(i,t) - SS(i,t)] \cdot [1 - Y(i,t)] \forall i,t$ Mixed integer linear programming techniques can be used to solve this multivariate problem. Integer linear programming models can be used where variables are constrained to take integer or whole number (as opposed to fractional) values. Mixed integer (MILP or MIP) problems require only some of the variables to take integer values, whereas pure integer (ILP or IP) problems require all variables to be integer.

In most energy markets, the bid cost curves for all commodities such as energy, reserve, ten minute spinning reserve, etc. are defined as piecewise linear curves. One of the main factors impacting the performance of the linear programming algorithms is the number of binary integer variables such as 0 and 1. If each segment of the piecewise linear bid curves for various commodities is modeled as a separate variable, the number of binary integer variables associated with the statuses of units would be equal to the number of bids times the number of segments of the corresponding piecewise linear bid curves.

Therefore, linear commodity bid cost curves are replaced with a single linear term and a set of associated linear equations and variables. Each piecewise linear commodity bid curve has a set of pairs $(p_{com}^{pl}(i,t,k), c_{com}^{pl}(i,t,k))$ of given vales associated with brake points k of piecewise linear bid cost curves. Since the bid cost curves $c_{com}(i,t) = f(p_{com}(i,t))$ are convex functions, the following linear equations ensure that values of a single term $c_{com}(i,t) = f(p_{com}(i,t))$ remain always on the corresponding piecewise linear curve:

$$p_{com}(i, t) = \sum_{k} p_{com}^{pl}(i, t, k) \cdot \omega_{com}^{pl}(i, t, k)$$

$$c_{com}(i, t) = \sum_{k} c_{com}^{pl}(i, t, k) \cdot \omega_{com}^{pl}(i, t, k)$$

subject to the following constraints:

$0 \leq \omega_{com}^{pl}(i,t,k) \leq 1$ and $$\sum_{k} \omega_{com}^{pl}(i, t, k) = 1$$

where $\omega_{com}^{pl}(i,t,k)$ are weighting variables associated to the piece-wise linear bid cost curve brake points. This enables modeling of each commodity costs with only one variable $c_{com}(i,t)$ that follows the convex piece-wise linear curve and that doesn't explicitly depend on brake points and with additional variables $\omega_{com}^{pl}(i,t,k)$ subject to the same constraints. To ensure that the solution for $c_{com}(i,t)$ follows the cost curves exactly under all circumstances (including non-convex curves), in the non-convex case the series $\omega_{com}^{pl}(i,t,k)$ cannot have more than two adjacent non-zero elements in the defining ordering of the series. In the general case the variables $\omega_{com}^{pl}(i,t,k)$ have to form special order sets ("SOS") modeled explicitly by the linear programming engine of the CPLEX product.

The solution to the problem is constrained by the following restraints. The bid ramping constraint restricts the maximal up and down changes of the bid's electrical generation between the two consecutive time steps, expressed in the following mathematical constraint:

$$p_{en}(i,t)-p_{en}(i,t-1) \leq \text{ramp}_{up}^{max}(i,t) \text{ and}$$

$$p_{en}(i,t-1)-p_{en}(i,t) \leq \text{ramp}_{dn}^{max}(i,t)$$

In another embodiment, the bid ramping constraint may need to be defined per segment of energy bid cost curve.

Another constraint is the startup variable and status variable constraints. The following constraints are imposed on start up variable Z(i,t):

$$Z(i,t-1)-Y(i,t)+Y(i,t-1) \geq 0$$

$$Z(i,t)+Y(i,t) \leq 1 \text{ and}$$

$$Z(i,t-1)-Y(i,t) \leq 0$$

The following constraint is imposed on regulating status variable:

$$W(i,t)-Y(i,t) \leq 0$$

There are additionally minimum up and down time constraints. The following mathematical relationships are related to the constraints n the bids minimum up and down times:

$$(Y(i,k+t+2)-Y(i,k+t+1))-(Y(i,t+1)-Y(i,t)) \geq -1$$

$$k=0,\ldots,MUT(i)-2,$$

$$t=0,\ldots,t_{end}-k-2$$

$$(Y(i,k+t+2)-Y(i,k+t+1))-(Y(i,t+1)-Y(i,t)) \leq 1$$

$$k=0,\ldots,MDT(i)-2,$$

$$t=0,\ldots,t_{end}-k-2$$

Another restraint is the limit on bid powers, as defined mathematically as follows:

$$p_{en}(i,t)-0.5 \cdot p_{reg}(i,t) \geq p_{min}(i,t) \cdot Y(i,t)+[RL(i,t)-p_{min}(i,t)] \cdot W(i,t)$$

and $$p_{en}(i,t)+p_{reg}(i,t)+p_{mnsr}(i,t)+p_{tmnsr}(i,t)+p_{tmor}(i,t) \leq [p_{max}(i,t)-SS(i,t)] \cdot Y(i,t)$$

Another restraint is the transmission constraint. The linear constraints that impose transmission constraints on line k as a function of generating power of bid i are defined by:

$$-P_{\lim}^t(k,t) \leq \sum_{i=1}^{N} shf(k,i) \cdot p_{en}(i,t) \leq P_{\lim}^t(k,t) \; \forall \; k,t$$

The above described embodiments are merely exemplary. Those of ordinary skill in the art may readily devise their own implementations that incorporate the principles of the present invention and fall within the spirit and scope thereof.

What is claimed is:

1. A computer implemented system for optimal energy and energy reserve dispatching in an electricity market of at least one market participant, said system comprising: a database; and
   a processor configured for:
   inputting constraints of said at least one market participant;
   clearing energy and energy reserve bids;
   calculating a minimum sum of total market costs using mixed integers to represent variables in the relationship;

$$\min C_{tot} = \sum_{t=1}^{T} \left\{ \sum_{I=1}^{N} \left[ c_{start}(i,t) \cdot Z(i,t) + c_{nold}(i,t) \cdot Y(i,t) + C_{en}(i,t) + c_{reg}(i,t) + \sum_{j \in com} c_j(i,t) \right] \right\}$$

wherein $\min C_{tot}$ is a minimum sum of total market costs, t is a time step of a time period T, i is an energy bid of N energy bids, $c_{start}(i,t)$ is a start up cost for an energy generating bid i at time step t, $Z(i,t)$ is a start up binary variable for the energy generating bid i at the time step t, $c_{nold}(i,t)$ is a no-load cost segment for the energy generating bid i at time step t, $Y(i,t)$ is a status binary variable for the energy generating bid i at the time t, $c_{en}(i,t)$ is a cost of the commodity energy for the energy generating bid i at time step t, $c_{reg}(i,t)$ is a cost of the commodity regulating reserve energy for the energy generating bid i at time step t,j is a bid curve identifier for a number of bid curves com, and $c_j(i,t)$ is a bid curve for the energy generating bid i at time step t; and
   pricing the dispatch of energy and energy reserve responsive to the minimum sum of total market costs considering said constraints of said at least one market participant using mixed integer linear programming techniques.

2. The system of claim 1, wherein said constraint is a market participant energy limit.

3. The system of claim 1, wherein said constraint is a load energy limit.

4. The system of claim 1, wherein said constraint is a market participant regulation availability.

5. The system of claim 1, wherein said constraint is a market participant regulation range.

6. The system of claim 1, wherein said constraint is a market participant spinning reserve limit.

7. The system of claim 1, wherein said constraint is a load spinning reserve limit.

8. The system of claim 1, wherein said constraint is a market participant non-spinning reserve limit.

9. The system of claim 1, wherein said constraint is a market participant capacity limit.

10. The system of claim 1, wherein said constraint is a load capacity limit.

11. The system of claim 1, wherein said pricing the dispatch of energy further comprises modeling linear bid curves corresponding to the energy and the energy reserve bids with a linear term and at least one associated linear equation for use in said mixed integer linear programming techniques.

12. The system of claim 1, wherein said pricing is further responsive to one or more cost functions associated with generation of energy over a time interval.

13. The system of claim 12 wherein said pricing is further configured for minimizing said one or more cost functions.

14. The system of claim 12 wherein said one or more cost functions comprise at least one of a start up cost, a no load cost, a cost of the commodity energy, and a cost of commodity regulating reserve energy.

15. The system of claim 1 wherein said energy reserve comprises at least one of ten minute spinning reserve, ten-minute non-spinning reserve, and thirty minute operating reserve.

16. The system of claim 1, wherein said pricing is further responsive to one or more power functions associated with consumption of energy over a time interval.

17. The system of claim 16 wherein said one or more power functions comprise at least one of power of commodity energy, power penalty factor, power of price sensitive load, power penalty factor of the price dependent load, and power of price non-sensitive load.

18. A method for optimal energy and energy reserve dispatching in an electricity market of at least one market participant, said method comprising:

inputting constraints of said at least one market participant;

clearing energy and energy reserve bids;

calculating a minimum sum of total market costs by using mixed integers to represent variables in the relationship:

$$\min C_{tot} = \sum_{t=1}^{T} \left\{ \sum_{i=1}^{N} \left[ c_{start}(i,t) \cdot Z(i,t) + c_{nold}(i,t) \cdot Y(i,t) + C_{en}(i,t) + c_{reg}(i,t) + \sum_{j \in com} c_j(i,t) \right] \right\}$$

wherein $\min C_{tot}$ is a minimum sum of total market costs, t is a time step of a time period T, i is an energy bid of N energy bids, $c_{start}(i,t)$ is a start up cost for an energy generating bid i at time step t, $Z(i,t)$ is a start up binary variable for the energy generating bid i at the time step t, $c_{nold}(i,t)$ is a no-load cost segment for the energy generating bid i at time step t, $Y(i,t)$ is a status binary variable for the energy generating bid i at the time t, $c_{en}(i,t)$ is a cost of the commodity energy for the energy generating bid i at time step t, $c_{reg}(i,t)$ is a cost of the commodity regulating reserve energy for the energy generating bid i at time step t, j is a bid curve identifier for a number of bid curves com, and $c_j(i,t)$ is a bid curve for the energy generating bid i at time step t; wherein the bid curves are modeled by a linear term and at least one associated linear equation; and pricing the dispatch of energy and energy reserves responsive to the minimum sum of total market costs considering said constraints of said at least one market participant using a mixed integer linear programming technique.

19. A computer readable medium containing program instructions recorded therein, which, when executed by a computer, causing the computer to implement a method for optimal energy and energy reserve dispatching in an electricity market of at least one market participant, said method comprising:

inputting constraints of said at least one market participant;

clearing energy and energy reserve bids;

calculating a minimum sum of total market costs by using mixed integers to represent variables in the relationship:

$$\min C_{tot} = \sum_{t=1}^{T} \left\{ \sum_{i=1}^{N} \left[ c_{start}(i,t) \cdot Z(i,t) + c_{nold}(i,t) \cdot Y(i,t) + C_{en}(i,t) + c_{reg}(i,t) + \sum_{j \in com} c_j(i,t) \right] \right\}$$

wherein $\min C_{tot}$ is a minimum sum of total market costs, t is a time step of a time period T, i is an energy bid of N energy bids, $c_{start}(i,t)$ is a start up cost for an energy generating bid i at time step t, $Z(i,t)$ is a start up binary variable for the energy generating bid i at the time step t, $c_{nold}(i,t)$ is a no-load cost segment for the energy generating bid i at time step t, $Y(i,t)$ is a status binary variable for the energy generating bid i at the time t, $c_{en}(i,t)$ is a cost of the commodity energy for the energy generating bid i at time step t, $c_{reg}(i,t)$ is a cost of the commodity regulating reserve energy for the energy generating bid i at time step t, j is a bid curve identifier for a number of bid curves com, and $c_j(i,t)$ is a bid curve for the energy generating bid i at time step t; wherein the bid curves are modeled by a linear term and at least one associated linear equation; and pricing the dispatch of energy and energy reserve responsive to the minimum sum of total market costs considering said constraints of said at least one market participant using a mixed integer linear programming technique.

* * * * *